(12) United States Patent
Chastain et al.

(10) Patent No.: US 9,882,993 B2
(45) Date of Patent: Jan. 30, 2018

(54) CREATING SERVICES USING SERVICE MODULES

(71) Applicant: AT&T Intellectual Property I, L.P., Atlanta, GA (US)

(72) Inventors: Walter Cooper Chastain, Atlanta, GA (US); Reuben Klein, East Brunswick, NJ (US); Frank Cariello, Middletown, NJ (US); Paul Edward Smith, Jr., Rockwall, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 171 days.

(21) Appl. No.: 14/527,268

(22) Filed: Oct. 29, 2014

(65) Prior Publication Data

US 2016/0127478 A1 May 5, 2016

(51) Int. Cl.
*H04L 29/08* (2006.01)
*H04L 12/24* (2006.01)

(52) U.S. Cl.
CPC .......... *H04L 67/16* (2013.01); *H04L 41/5054* (2013.01)

(58) Field of Classification Search
CPC ........................... H04L 41/5054; H04L 67/16
See application file for complete search history.

(56) References Cited

U.S. PATENT DOCUMENTS

| | | | |
|---|---|---|---|
| 6,873,698 B1 | 3/2005 | Pearson et al. | |
| 7,151,935 B2 | 12/2006 | Shang et al. | |
| 7,509,648 B1 | 3/2009 | Afshar et al. | |
| 7,926,063 B2 | 4/2011 | Afshar et al. | |
| 8,667,503 B2 | 3/2014 | Afshar et al. | |
| 2007/0294364 A1* | 12/2007 | Mohindra | G06F 8/61 709/217 |
| 2010/0027774 A1 | 2/2010 | Capuozzo et al. | |
| 2011/0161911 A1* | 6/2011 | Schultz | G06F 8/36 717/101 |
| 2012/0136747 A1 | 5/2012 | Wang | |
| 2014/0130010 A1 | 5/2014 | Afshar et al. | |
| 2014/0235239 A1 | 8/2014 | Kotecha | |
| 2015/0046513 A1* | 2/2015 | Elias | H04L 69/22 709/203 |

* cited by examiner

*Primary Examiner* — Arvin Eskandarnia
*Assistant Examiner* — Gil H. Lee
(74) *Attorney, Agent, or Firm* — Hartman & Citrin LLC

(57) ABSTRACT

Concepts and technologies are disclosed herein for creating services using service modules. A control system can detect a service creation request. The control system can identify service modules to be included in a service requested by the service creation request. A service control function can be created to manage the service requested by the service creation request. The service modules can be coupled together, and the service requested by the service creation request can be output.

20 Claims, 7 Drawing Sheets

CREATING SERVICES USING SERVICE MODULES

BACKGROUND

Service creation, maintenance, and delivery have evolved over the past several years. One area that has changed services is the advent of virtualization. For example, the European Telecommunications Standards Institute ("ETSI") network functions virtualization ("NFV"), software defined networking ("SDN"), and other "cloud" computing architectures and technologies have resulted in a change to the traditional hardware-software model or paradigm. For example, services can be created and deployed on commercial-off-the-shelf ("COTS") hardware, which allows flexibility in terms of scaling, locating, and/or using the services.

Building services that were designed for deployment on dedicated infrastructure and instead deploying these same services in a virtualized infrastructure may not provide the benefits of using a virtualized network. Similarly, accommodating message routing between service components used to provide a virtualized service may require increased complexity of the virtualized service relative to services built on a dedicated infrastructure. Thus, while virtualization has provided flexibility to network operators and other entities, several challenges pose difficulties in migrating services to virtualized networks.

SUMMARY

The present disclosure is directed to creating services using service modules. As used herein, the term "service modules" can be used to refer to a component of one or more types of services including, but not limited to, basic services, segmented services, composite services, or the like. Thus, the term "service module" and/or variants thereof can be used to refer to virtual service function components, virtual service functions, service components, service control functions, basic services, second layer service control functions, combinations thereof, or the like, as well as the networking and/or infrastructure resources that support these functions.

According to various embodiments of the concepts and technologies described herein, a control system can, via execution of a service control or an operations management controller, create three or more types of services including, but not limited to, basic services, segmented services, and/or composite services. For purposes of this description and the appended claims, the term "create" when used to refer to services can be used to refer to designing a service and instantiating a service. Thus, when the word "create" is used herein with respect to services, the term may be used to refer to one or both of designing a service or instantiating a service. According to various embodiments of the concepts and technologies described herein, the service control can create a service by identifying one or more service modules or service components. According to various embodiments, a basic service can be created by tightly coupling one or more service components together and introducing a service control function. The service components can be formed by coupling or chaining together multiple virtual service functions. The virtual service functions can be created by coupling together two or more virtual service function components. It should be understood that this example is illustrative and therefore should not be construed as being limiting in any way.

In some embodiments, the service control can be applied to basic services, segmented services, or composite services. According to various embodiments of the concepts and technologies described herein, a segmented service can be formed by coupling together (or chaining, joining, or associating together) two or more basic services, other segmented services, composite services, or other service components. Thus, the service control functions of the basic services can remain within the basic services, but may not be complemented by other service control functions outside of the basic services. It should be understood that this example is illustrative and therefore should not be construed as being limiting in any way. According to various embodiments of the concepts and technologies described herein, a composite service can be formed by chaining or joining together (or associating together) two or more basic services, segmented services, other composite services, or other service components and introducing a second layer service control function that tightly couples together the services that provide the functionality associated with the composite service. Thus, the service control functions of the basic services can remain within the basic services, and may be complemented by other service control functions outside of the basic services.

According to one aspect of the concepts and technologies disclosed herein, a method is disclosed. The method can include detecting, at a processor of a control system, a service creation request, identifying, by the processor, service modules to be included in a service specified by the service creation request, and creating, by the processor, a service control function to manage the service requested by the service creation request. The method also can include coupling, by the processor, the service modules, and deploying, by the processor, the service requested by the service creation request. In some embodiments, the service modules can be identified based upon one or more "recipes." As used herein, a "recipe" or "service recipe" can be used to refer to data that can define service components including hardware, software, and/or transport, and can include components from an infrastructure scope, a service or application scope, and/or a network scope.

In some embodiments, the service requested by the service creation request can include a basic service, and the service modules can include a service component. In some embodiments, the service requested by the service creation request can include a basic service, and the service modules can include a service component that can include multiple virtual service functions. In some embodiments, each of the included virtual service functions can include virtual service function components that are commonly controlled, and each of the virtual service function components can include a feature of the service.

In some embodiments, the method also can include determining, by the processor, that tight coupling of the service modules is not desired, and instantiating, by the processor, a segmented service in response to determining that the tight coupling of the service modules is not desired. In some embodiments of the concepts and technologies described herein, the processor can determine whether or not tight coupling is desired based upon a service recipe, though this is not necessarily the case. In some embodiments, the service modules can include basic services. In some embodiments, each of the basic services can include one or more service components and a service control function.

In some embodiments, the method can include determining, by the processor, that tight coupling of the service modules is desired, and deploying, by the processor, a composite service in response to determining that the tight coupling of the service modules is desired. In some embodiments, the service modules can include basic services. Each of the basic services can include a service component and a service control function, and the composite service can include a second layer service control function. In some embodiments, the method also can include establishing, by the processor, network transport for the service between the service modules. The network transport can be established on network infrastructure. Deploying the service can include installing the various virtual network functions and virtual service functions of a service on the network infrastructure.

According to another aspect of the concepts and technologies disclosed herein, a system is disclosed. The system can include a processor and a memory. The memory can store computer-executable instructions that, when executed by the processor, cause the processor to perform operations. The operations can include detecting a service creation request, identifying service modules to be included in a service requested by the service creation request, creating or identifying a service control function to manage the service requested by the service creation request, coupling the service modules, and deploying the service requested by the service creation request.

In some embodiments, the service requested by the service creation request can include a basic service, and the service modules can include a service component. In some embodiments, execution of the computer-executable instructions by the processor can cause the processor to perform operations further including determining (e.g., by analyzing a recipe that may explicitly or implicitly specify tight coupling or loose coupling) that tight coupling of the service modules is not desired, and deploying a segmented service in response to determining that the tight coupling of the service modules is not desired. In some embodiments, the service modules can include basic services, and each of the basic services can include a service component and a service control function. In some embodiments, the computer-executable instructions, when executed by the processor, cause the processor to perform operations further including determining that tight coupling of the service modules is desired, and deploying a composite service in response to determining that the tight coupling of the service modules is desired. The service modules can include basic services, each of the basic services can include a service component and a service control function, and the composite service can include a second layer service control function.

According to yet another aspect, a computer storage medium is disclosed. The computer storage medium can have computer-executable instructions stored thereon that, when executed by a processor, cause the processor to perform operations. The operations can include detecting a service creation request, identifying service modules to be included in a service requested by the service creation request, creating or identifying a service control function to manage the service requested by the service creation request, coupling the service modules, and deploying the service requested by the service creation request.

In some embodiments, the service requested by the service creation request can include a basic service, and the service modules can include a service component. In some embodiments, the computer-executable instructions, when executed by the processor, cause the processor to perform operations further including determining that tight coupling of the service modules is not desired, and deploying a segmented service in response to determining that the tight coupling of the service modules is not desired. In some embodiments, the service modules can include basic services, and each of the basic services can include a service component and a service control function. In some embodiments, the computer-executable instructions, when executed by the processor, cause the processor to perform operations further including determining that tight coupling of the service modules is desired, and deploying a composite service in response to determining that the tight coupling of the service modules is desired. The service modules can include basic services, each of the basic services can include a service component and a service control function, and the composite service can include a second layer service control function.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
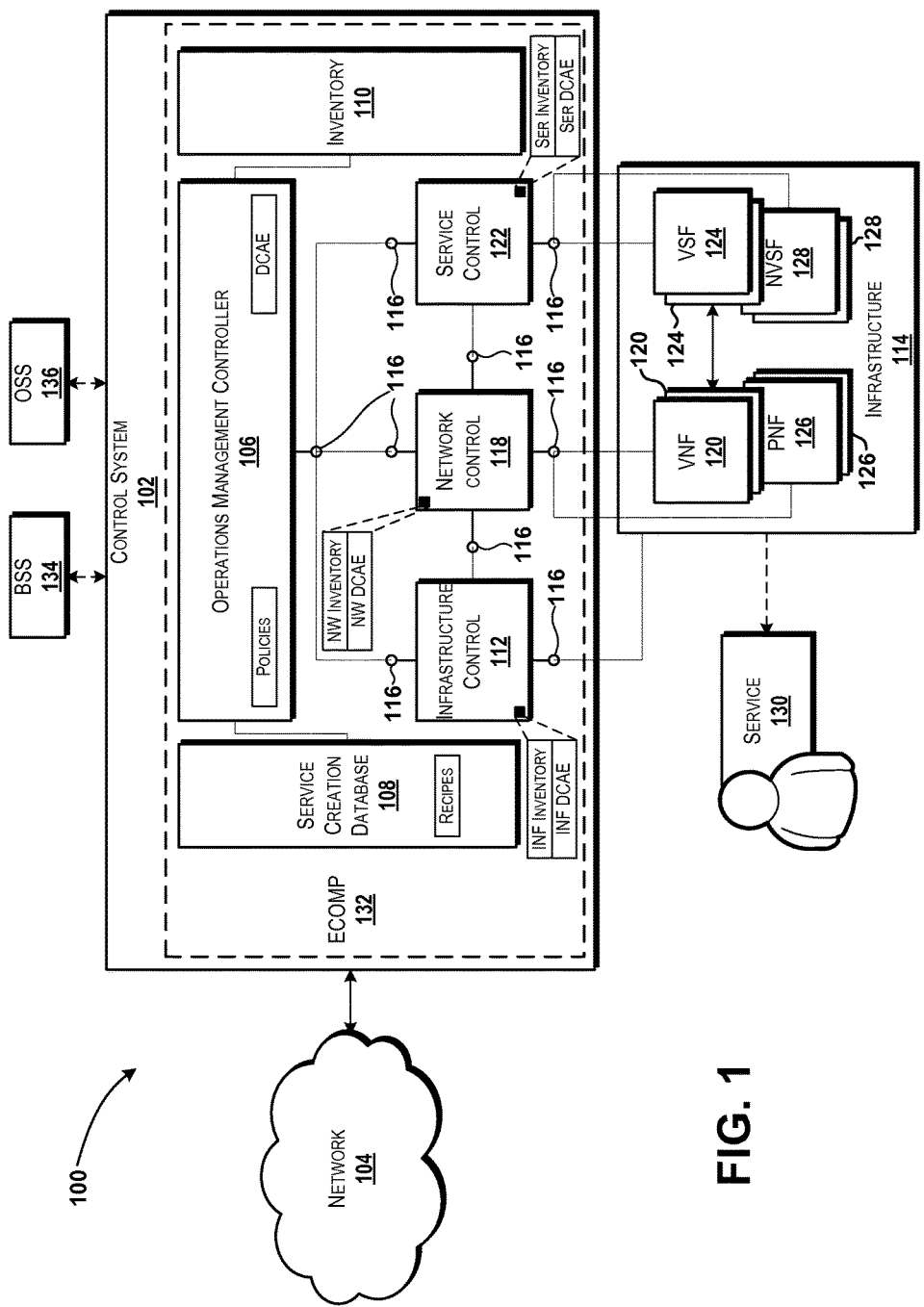
FIG. 1 is a system diagram illustrating an illustrative operating environment for various embodiments of the concepts and technologies described herein.

The following detailed description is directed to creating services using service modules. According to various embodiments of the concepts and technologies described herein, a control system can, via execution of an operations management controller or a service control, create three or more types of services including, but not limited to, basic services, segmented services, and/or composite services. According to various embodiments of the concepts and technologies described herein, the service control can create a service by identifying one or more service modules or service components. According to various embodiments, a basic service can be created by tightly coupling one or more service components together by introducing a service control function. The service components can be formed by coupling or chaining together multiple virtual service functions. The virtual service functions can be created by coupling together two or more virtual service function components. It should be understood that this example is illustrative and therefore should not be construed as being limiting in any way.

In some embodiments, the service control can create segmented services or composite services. According to various embodiments of the concepts and technologies described herein, a segmented service can be formed by coupling together (or chaining, joining, or associating together) two or more service modules such as service components, basic services, composite services, or even other segmented services. The service control functions of the service modules can remain within the services chained together and may not be complemented by other service control functions outside of the service modules (e.g., basic services). It should be understood that this example is illustrative and therefore should not be construed as being limiting in any way. According to various embodiments of the concepts and technologies described herein, a composite service can be formed by chaining or joining together (or associating together) two or more service modules such as service components, basic services, segmented services, or even other composite services and introducing a second layer service control function that tightly couples together the service modules. Thus, the service control functions of the service modules can remain within the service modules and/or may be complemented by other service control functions.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for creating services using service modules will be described, according to an illustrative embodiment. The operating environment 100 shown in FIG. 1 includes a computing system that can host a network control framework (hereinafter referred to as a "control system") 102. The control system 102 can operate on, in communication with, and/or as a part of a communications network ("network") 104. Additional aspects of the network 104 are illustrated and described below with reference to FIG. 6. Briefly, it should be understood that the network 104 can include almost any type of computer network as well as communications networks.

According to various embodiments, the functionality of the control system 102 may be provided by one or more server computers, workstations, desktop computers, laptop computers, other computing systems, combinations thereof, or the like. In some embodiments, the functionality of the control system 102 can be provided by a distributed computing system that can host processing and/or storage resources that collectively can be configured to provide the functionality illustrated and described herein. Thus, it should be understood that the functionality of the control system 102 can be provided by a single device, by two similar devices, and/or by two or more dissimilar devices. For purposes of describing the concepts and technologies disclosed herein, the control system 102 is described herein as including a server computer. It should be understood that this embodiment is illustrative, and should not be construed as being limiting in any way.

The device that hosts the control system 102 can execute an operating system (not shown in FIG. 1) and one or more application programs that can provide the functionality of the control system 102 illustrated and described herein. The operating system can include a computer program for controlling the operation of the device, and the application programs can include executable programs configured to execute on top of the operating system to provide various functions as illustrated and described herein. Thus, while the control system 102 is illustrated and described as including multiple elements, it should be understood that the functionality of the elements shown in FIG. 1 can be provided by application modules executed by a single device, in some embodiments. In some other embodiments, the functionality of the elements shown in FIG. 1 can be provided by multiple devices that can host one or more elements of the control system 102. As such, the illustrated and described embodiment should be understood as being illustrative of one contemplated embodiment of the concepts and technologies described herein and should not be construed as being limiting in any way.

As shown in FIG. 1, the control system 102 can include an operations management controller 106. The operations management controller 106 can be configured to provide control and management of the control system 102 and/or the various elements thereof. According to various embodiments, the operations management controller 106 can provide high level and end-to-end control of services, creation of services, and/or management of services. The operations management controller 106 can manage services across multiple scopes (e.g., through infrastructure, network, and service scopes), and can control and orchestrate service creation and management as illustrated and described herein.

The operations management controller 106 can serve as a master service orchestrator ("MSO") for the control system 102. The operations management controller 106 can instantiate new services based upon "recipes" that can be stored in a service creation database 108. The operations management controller 106 also can base new services upon information stored in an inventory 110. The operations management controller 106 also can instantiate scope control domain entities (e.g., controllers for infrastructure, network resources, and/or service functions), as will be explained in more detail below.

The operations management controller 106 can handle exceptions that can be generated by the operations management controller 106 and/or exceptions that may be passed to the operations management controller 106 from the scope control domain (e.g., the controllers for the infrastructure, network resources, and/or the service functions). The operations management controller 106 also can run a high level data collection, analytics, and event handling ("DCAE") process to analyze data relating to services and/or the various components for managing the services and/or its associated infrastructure, network, and service components. The operations management controller 106 also can run a policy decision function using a high level set of policies for service creation and/or control.

As mentioned above, the service creation database 108 can define products and services using definitions of components of services such as hardware, software, and/or transport that can be referred to herein as "recipes" or "service recipes." The recipes can specify one or more components of a service and a process or operations for putting the components together. Thus, the recipes may involve a service scope (e.g., a set of service functions), a network scope (e.g., a set of network functions and/or information indicating how network transport is to be established, maintained, and/or used), and an infrastructure scope (e.g., where on the network 104 the network and service functions are to be located). The recipes also can implicitly or explicitly specify whether the various components of the service should be tightly coupled together and/or loosely coupled together, as will be explained in more detail below. It should be understood that the term "service" also can include an "application," and that the term "service" is not used to limit the concepts and technologies described herein in any way. The service creation database 108 can be used by a service provider, by third parties, and/or by customers.

The inventory 110 can maintain or reflect up-to-date information about resource utilization. The information can include a total number of resources, an amount of available resources, an amount of resources in use, or the like. It should be understood that the "resources" can include infrastructure resources, network resources, and/or service resources. Thus, the inventory 110 can be used to understand what resources (in terms of infrastructure, network, and/or service) exist, what resources are in use, and/or what resources are free or available.

According to various embodiments, the inventory 110 can reside entirely within a control domain (e.g., within a service domain, network domain, or infrastructure domain) or outside of the domains, e.g., in an inventory and/or data structure that is hosted outside of the controllers illustrated and described herein. Thus, in some embodiments the inventory 110 can include data indicating or reflecting all inventory (infrastructure, network, and service) for the entire network 104 and/or the elements in communication with the network 104. Thus, the inventory 110 can provide end-to-end active view capability for active and/or inactive resources across all scopes of the control system 102.

In some other embodiments, the inventory may be divided across the controllers so that each controller can have a local inventory that relates to that controller's scope. A controller for the infrastructure domain, for example, can maintain an infrastructure inventory. Similarly, controllers for network and service scopes can maintain scope-specific inventories. The inventory 110 still can provide end-to-end viewing capability for the divided inventory embodiment, if desired. It should be understood that this example is illustrative and therefore should not be construed as being limiting in any way.

According to various embodiments, the operations management controller 106 can communicate with one or more infrastructure control elements or controllers ("infrastructure control") 112. The infrastructure control 112 can manage assets of network infrastructure ("infrastructure") 114. Thus, the infrastructure control 112 can interact with the infrastructure 114 to instantiate virtual resources such as virtual machines and/or virtual storage devices and/or to allocate hardware resources that will host various service and/or network functions as illustrated and described herein. According to various embodiments, however, the infrastructure control 112 may not manage networking functions and/or service functions, as will be explained in more detail below.

The infrastructure control 112 can include and/or can execute a policy engine using an infrastructure set of policies. The infrastructure control 112 also can handle infrastructure scope exceptions, in some embodiments. The infrastructure control 112 can include functionality for managing and orchestrating the infrastructure 114; infrastructure EMFs, which may manage various fault, configuration, accounting, performance, and security ("FCAPS") capabilities; an infrastructure data, collection, analytics, and events ("DCAE") process (labeled as "INF DCAE" in FIG. 1) that can provide information to the controller and/or to the operations management controller 106; a policy decision function with infrastructure scope policies; and/or an infrastructure inventory function (labeled "INF Inventory" in FIG. 1) that can represent infrastructure-scoped inventory and usage information or provide this information to the inventory 110. It should be understood that this example is illustrative and therefore should not be construed as being limiting in any way.

The infrastructure control 112 can receive instructions and/or requests from the operations management controller 106 or other entities via an operations management application programming interface ("API") 116. As shown in FIG. 1, there can be multiple APIs 116 that can be called or accessed by various elements of the control system 102 to support the functionality illustrated and described herein. Although the APIs 116 are given the same reference numeral in the drawings, it should be understood that one or more (or each) of the APIs 116 can use different technologies (e.g., formats and/or semantics) to support calls to the various elements and/or to support the communications illustrated and described herein. According to some embodiments, the API 116 between the infrastructure control 112 and the operations management controller 106 can correspond to an operations management ("OM") API 116, though this is not necessarily the case.

Similarly, the infrastructure control 112 can communicate with a network control device or controller (hereinafter referred to as the "network control") 118 via a software defined networking ("SDN") API 116. Thus, it can be appreciated that the infrastructure control 112 and the network control 118 can support SDN and virtualization technologies simultaneously. As will be explained in more detail below, the network control 118 can be configured to create and manage virtual networking functions ("VNFs") 120 within the infrastructure 114. In some instances, the infrastructure control 112 also can load VM images with embedded VNFs 120 (e.g., a virtual switch) in addition to, or instead of, the network control 118. The functionality of the network control 118 will be described in more detail below.

The infrastructure control 112 also can communicate with the infrastructure 114 via an API 116. Thus, the infrastructure control 112 can interact with the infrastructure 114 to instantiate resources and/or allocate hardware to support various functions as illustrated and described herein. In addition to supporting the VNFs 120, the infrastructure 114 also can interact with a service control device or controller (hereinafter referred to as the "service control") 122 to receive instructions for instantiating one or more virtual service functions ("VSFs") 124 within the infrastructure 114. A VSF 124 can include a virtualized application or application component, and can be used to create other services of various types including, but not limited to, basic services, segmented services, and/or composite services as will be illustrated and described in more detail herein. The functionality of the service control 122 and creation of various types of services using the service control 122 will be described in more detail below.

The operations management controller 106 also can communicate with the network control 118. The network control 118 can be responsible for management, deployment, operation, and coordination of a transport network for a particular service. According to various embodiments, the transport network between one or more components of a service ("service modules") can be created by creating a group of one or more VNFs 120 within the infrastructure 114. The transport network also can include physical network functions ("PNFs") 126, which can be selected from an available inventory of physical resources, configured, and/or controlled by the network control 118. The transport network can include various VNFs 120, PNFs 126, and/or infrastructure networking functions such as European Telecommunications Standards Institute PNFs ("ETSI PNFs"). In some embodiments, the transport network may include other types of networking functions such as leaf switches, spine switches, or the like, while in some other embodiments, leaf switches and/or spine switches may be considered part of the infrastructure 114. The VNFs 120 can include virtualized network functions that can exist in the network scope. Thus, according to various embodiments, the VNFs 120 can include virtual switches ("vSwitches"), virtualized routing functions and/or virtual routers, a virtual tap, or the like. Because the transport network can include other types of functions, it should be understood that these examples are illustrative and therefore should not be construed as being limiting in any way.

The network control 118 also can establish and manage software defined networks, maintain a network scope resource inventory, run a network scope data collection and analysis process, run a policy engine using a network scope set of policies, and handle network scope exceptions. The network control 118 can include a software defined network controller; one or more virtual network function management functions; one or more network element management functions ("EMFs"), which can manage FCAPS for network scoped services; a network DCAE process (labeled as "NW DCAE" in FIG. 1), which can provide information to the network control 118 and/or the operations management controller 106; a network policy engine with network scope policies; and a network inventory function (labeled as "NW Inventory" in FIG. 1), which can provide network scoped inventory and usage information to the inventory 110.

According to various embodiments, the network control 118 can receive requests from the operations management controller 106 via an API 116 such as the OM API 116 discussed above. The requests from the operations management controller 106 received via the OM API 116 can instruct the network control 118 to create, modify, and/or terminate one or more networking functions such as VNFs 120, PNFs 126, and/or some infrastructure networking functions, if controlled or controllable by the network control 118. These infrastructure networking functions can include network hardware (e.g., switches, leaf switches and spine switches, or the like) and other infrastructure networking functions. Some other infrastructure networking functions (e.g., wires, physical ports, switches, leaf switches and spine switches (if not controlled by network control 118)), or the like, can be considered a part of the infrastructure 114. The network control 118 also can be configured to receive instructions to establish or modify transport using VNFs 120 and/or PNFs 126 in addition to, or instead of, instantiating the VNFs 120 and/or the PNFs 126. It should be understood that this example is illustrative and therefore should not be construed as being limiting in any way.

The network control 118 also can initiate requests to the infrastructure control 112 via the OM API 116 to request and/or obtain additional network resources. For example, the network control 118 can request the infrastructure control 112 to allocate one or more virtual machines ("VMs") and load an image with an embedded VNF 120 to the VM. The network control 118 also can receive requests via an SDN API 116 from infrastructure control 112 to create, modify, and/or terminate transport. Thus, it can be appreciated that the network control 118 can support SDN and virtualization technologies simultaneously. It should be understood that this example is illustrative and therefore should not be construed as being limiting in any way.

The operations management controller 106 also can communicate with a service control 122. The service control 122 can be responsible for management, deployment, operation, and coordination of services. Services can be provided by and/or can include one or more VSFs 124 and/or non-virtualized service functions ("NVSFs") 128. According to various embodiments, the services and/or service components ("service modules") can be created by the service control 122 by creating a group of one or more VSFs 124 and/or NVSFs 128 within the infrastructure 114. Thus, it should be understood that the NVSFs 128 can be created and/or controlled by the service control 122. The service control 122 can create three or more types of services including, but not limited to, basic services, segmented services, and/or composite services. It also should be understood that the operations management controller 106 can create the VSFs 124 and initiate requests to the infrastructure 114 and network control 118. As such, it should be understood that the operations management controller 106 and/or the service control 122 can create a service, depending upon a degree of delegation awarded to the service control 122 by the operations management controller 106 when the operations management controller 106 created the service control 122.

According to various embodiments, the service control 122 also can maintain a service scope resource inventory (labeled "Ser Inventory" in FIG. 1). The service scope resource inventory can be maintained at the service control 122, in some embodiments, and can provide service scope resource inventory and usage information to the inventory 110. The service control 122 can also run a service scope DCAE (labeled as "Ser DCAE" in FIG. 1) to analyze messages and/or events occurring within or relating to services, service components, and/or service functions such as the VSFs 124 and the NVSFs 128.

The service control 122 also can run a policy engine for a service scope set of policies. Thus, service-specific policies can be applied and/or used by the service control 122 when creating services, service components, and/or service functions such as the VSFs 124 and/or the NVSFs 128. The service control 122 also can handle service scope exceptions, in some embodiments. As noted above, the operations management controller 106 also can create services, service components, and/or service functions depending upon the degree to which the operations management controller 106 delegates control to the service control 122. It should be understood that these example components of the service control 122 are illustrative and therefore should not be construed as being limiting in any way.

The service control 122 can be responsible for management and control of services and/or the components or functions of the services. According to various embodiments, the service control 122 can manage VSFs 124 and/or NVSFs 128 of services being controlled. The service control 122 also can handle service EMFs, which can manage FCAPS for services being controlled. The service DCAE process can provide information to the service control 122 and/or the operations management controller 106. The service control 122 also can include a service policy engine, which can apply and/or enforce service scope policies. The service inventory can provide service scope inventory and/or usage information to the inventory 110.

According to various embodiments, the service control 122 can receive requests from the operations management controller 106 via an API 116 such as the OM API 116 discussed above. The requests from the operations management controller 106 received via the OM API 116 can instruct the service control 122 to create, modify, and/or terminate one or more service functions such as VSFs 124, the NVSFs 128, and the like. It should be understood that this example is illustrative and therefore should not be construed as being limiting in any way.

The service control 122 also can initiate requests to the infrastructure control 112 via the OM API 116 to request and/or obtain additional infrastructure resources and/or other resources. The service control 122 also can initiate requests via an SDN API 116 to the network control 118. Thus, it can be appreciated that the service control 122 can support SDN and virtualization technologies simultaneously. These requests can be configured to request creation, modification, and/or termination of service related transport (e.g., transport between service functions and/or service control functions). It should be understood that this example is illustrative and therefore should not be construed as being limiting in any way.

The APIs 116 illustrated and described herein can include two or more types of APIs 116. In some embodiments, as mentioned above, the APIs 116 can include an OM API 116 and/or SDN APIs 116. The APIs 116 can be exposed by some or all of the components within the control system 102. The APIs 116 can be exposed by the components to each other, for various purposes. For example, the APIs 116 can include an operations management API 116, which can be exposed by the operations management controller 106; infrastructure APIs 116, which can be exposed by the infrastructure control 112; network APIs 116, which can be exposed by the network control 118; and service APIs 116, which can be exposed by the service control 122. Thus, it can be appreciated that the control system 102 and the components thereof can support SDN and virtualization technologies simultaneously.

The APIs 116 can be used to enable operational management within the control system 102 and between the control system 102 and the infrastructure 114. The APIs 116 can be exposed in either direction. As such, the APIs 116 can be exposed in a southbound direction, e.g., from the operations management controller 106 to the infrastructure control 112, the network control 118, or the service control 122; from the infrastructure control 112 to the infrastructure 114; from the network control 118 to the VNFs 120 loaded to the infrastructure 114; and/or from the service control 122 to the VSFs 124 loaded to the infrastructure 114. The APIs 116 also can enable communications in a northbound direction, e.g., the APIs 116 can enable the VNFs 120 to access the network control 118; the VSFs 124 to access or communicate with the service control 122; and the infrastructure 114 to access the infrastructure control 112. Similarly, the APIs 116 can be accessed by the infrastructure control 112, the network control 118, and/or the service control 122 to enable access to the operations management controller 106. It should be understood that this example is illustrative and therefore should not be construed as being limiting in any way.

The SDN APIs 116 can be exposed by the network control 118 to the operations management controller 106, the infrastructure control 112, and the service control 122. The SDN APIs 116 can enable the operations management controller 106, the infrastructure control 112, and the service control 122 to make requests to the network control 118 for SDN services. It should be understood that this example is illustrative and therefore should not be construed as being limiting in any way.

By creating, allocating, and/or instantiating the VNFs 120, the PNFs 126, the VSFs 124 and/or the NVSFs 128, the control system 102 can create a service 130. It should be understood that this example is illustrative and therefore should not be construed as being limiting in any way.

According to various embodiments, the control system 102 can integrate an enhanced control, orchestration, management, and policy framework (hereinafter referred to as "ECOMP") 132, which can be integrated into the control system 102. The ECOMP 132 can enable rapid service creation by combining pre-built components and/or functions. The ECOMP 132 also can enable dynamically elastic capacity management by enabling scaling and instantiation. The ECOMP 132 also can support control functions. The control functions can be driven by real-time analytics and policy decisions. The ECOMP 132 also can support unified operations, administration, and management across the three scopes (e.g., infrastructure, network, and service). The ECOMP 132 also can support optimization of services 130 and/or the components, as well as analytics of the services 130, components thereof, and/or the various components of the control system 102. As illustrated and described in the FIGURES, the ECOMP 132 can be an element of the control system 102, in some embodiments, while in other embodiments the control system 102 can correspond to an embodiment of the ECOMP 132. It should be understood that these examples are illustrative and therefore should not be construed as being limiting in any way.

The ECOMP 132 can include a service design and creation ("SDC") environment, an active and available inventory ("AAI"), an operations management framework ("OMF"), and/or a service, infrastructure, and/or network control. Thus, the ECOMP 132 can include, in some embodiments, the service creation database 108, the inventory 110, the operations management controller 106, and/or one or more of the infrastructure control 112, the network control 118, and/or the service control 122. It should be understood that this example is illustrative and therefore should not be construed as being limiting in any way.

The SDC component of the ECOMP 132 can enable developers, service designers, network planners/engineers, operations planners and product managers, other entities, or the like, to create, organize, prototype, and deploy services 130. In some embodiments, service definitions can be instantiated by the OMF and the resulting service instances can be recorded in the AAI. According to various embodiments, components associated with a service 130 can be created in the SDC component and stored as recipes. Thus, the SDC component can store recipes for VSF components ("VSFCs", which are illustrated and described with reference to FIG. 2), VSFs 124, service components (illustrated and described with reference to FIG. 2), basic services (illustrated and described with reference to FIG. 2), segmented services (illustrated and described with reference to FIG. 2), composite services (illustrated and described with reference to FIG. 2), and various network and/or infrastructure resources. The recipes also can indicate whether or not various components of services 130 are to be tightly coupled, loosely coupled, or a combination thereof. It should be understood that this example is illustrative and therefore should not be construed as being limiting in any way.

As used in the description and the claims, the phrase "tightly couple" and/or variants thereof can be used to refer to service modules that are joined, chained, and/or used together in a manner in which the interdependency, coordination, and information flow between the service modules is high (relative to loosely coupled service modules) and as a result, the probability that one service module may affect another is high (relative to loosely coupled service modules). Thus, the phrase "loosely couple" and/or variants thereof can be used to refer to service modules that have a relatively low interdependency, coordination, and/or information flow (relative to tightly coupled service modules) and/or service modules that have a low probability of affecting one another.

According to various embodiments, it may be preferable to design services that are loosely coupled as service modules that are loosely coupled may be reusable and/or may be simpler than tightly coupled service modules. Such reusability may result in faster implementation times (for services that use the service modules) and/or more efficient use of resources. Similarly, tightly coupled service modules may be more complex than loosely coupled components and may not be reusable. In some instances, however, service modules may affect one another (even unintentionally), and the service modules therefore may be tightly coupled together through the use of a service control function to improve performance and reliability. As noted above, the recipes used to design and/or instantiate services can indicate (implicitly or explicitly) if the service modules should be tightly coupled and/or loosely coupled, in some embodiments.

According to various embodiments of the concepts and technologies described herein, service modules can be termed to be "tightly coupled" if a service control function controls the service modules. This definition may be specific to user defined network cloud ("UDNC") technology, though this is not necessarily the case.

The AAI can provide real-time views of services, infrastructure, and networks in aggregate. The AAI can obtain the data from the service control 122 and the network control 118, and/or can supplement views with customer and account data. The OMF can provide and extend upon FCAPS capabilities through the use of analytics, policy, orchestration, and control functions. The OMF can be a repeating pattern of control, orchestration, DCAE, and policy management functions. It should be understood that this example is illustrative and therefore should not be construed as being limiting in any way.

In some embodiments, the OMF and service, infrastructure, and network control functions can form a series of closed loop control capabilities. These capabilities can be referred to as "operational control loops." These "operational control loops" can be based on data and events collected and analyzed via the DCAE. Responsive actions can be based upon policy, and may be taken by one or more of orchestration or controller functions. "Operational control loops" can be repeating patterns that may be implemented in various locations and supporting various scopes of operation.

In some embodiments, the OMF can interact with one or more business support system ("BSS") 134 and one or more operations support system ("OSS") 136. The BSS 134 and the OSS 136 can be external to the ECOMP 132, in some embodiments. The BSS 134 and the OSS 136 can interact with customers and operations in support of activities and aggregate capabilities across UDNC and non-UDNC services.

Each instantiation of the OMF can be specifically tailored to the scope in which the OMF operates. The OMF may exist as a top-level end-to-end function that can be separate from service, infrastructure, and network control, and the platform components of the OMF may exist in various places within service and network control. It should be understood that this example is illustrative and therefore should not be construed as being limiting in any way.

As mentioned above, although the operations management controller 106, the service creation database 108, the inventory 110, the infrastructure control 112, the network control 118, the service control 122, and the ECOMP 132 are illustrated as components of the control system 102, it should be understood that each of these components, or combinations thereof, may be embodied as or in stand-alone devices or components thereof operating as part of or in communication with the network 104 and/or the control system 102. Thus, for example one or more of these components can be hosted by a server computer or other computing device that can access other devices via one or more of the APIs 116, and/or can be accessed via one or more of the APIs 116. As such, the illustrated embodiment should be understood as being illustrative of only some contemplated embodiments and should not be construed as being limiting in any way.

In practice, the operations management controller 106 can detect a request for a service 130. According to various embodiments, the operations management controller 106 can detect a request to configure or reconfigure a service 130 or a request for a new service 130. In some embodiments of creating or scaling services 130, the operations management controller 106 can analyze one or more policies to determine how the scaling or creation of the service 130 should be handled. The operations management controller 106 also can access the service creation database 108 to identify one or more "recipes" that can be used to scale or create the service 130. The recipes can define service components including hardware, software, and/or transport.

The operations management controller 106 can access the inventory 110 to determine if the resources needed to support the new or scaled service 130 are available for use. The operations management controller 106 also can identify a service control 122 that is to handle the scaled or created service 130. It can be appreciated that in some embodiments, a scaled service 130 may be controlled by a service control 122 that already is controlling the components of a service 130. The operations management controller 106 can select, allocate, and/or create the service control 122.

The operations management controller 106 also can instruct the infrastructure control 112 to instantiate one or more VMs and to load and validate VNFs 120 and/or VSFs 124 to the VMs. It should be understood that if the service is being scaled down, that the infrastructure control 112 may de-allocate VMs, VNFs 120, and/or VSFs 124 instead of instantiating the VMs, VNFs 120, and/or VSFs 124. The infrastructure control 112 can also instruct the network control 118 to create or establish transport between the VMs, the VNFs 120, the VSFs 124, and/or the service control 122. In the case of scaled down services 130, it can be appreciated that the network control may de-allocate or tear down transport. The network control 118 can report the event to the network DCAE and/or update the network inventory (and/or the inventory 110).

The service control 122 can receive instructions from the operations management controller 106 to instantiate or tear down one or more VSFs 124. The service control 122 can report the event to a service DCAE and update the service inventory (and/or the inventory 110). The network control 118 also can receive instructions to establish transport between the new VSFs 124 and report the event to the network DCAE for scaled up services 130 and/or to tear down the VSFs 124 and report those events to the network DCAE for scaled down services 130. The network control can establish transport using VNFs 120 and/or PNFs 126. The operations management controller 106 can validate the scaled or created service 130 end-to-end and/or update the inventory 110.

According to various embodiments of the concepts and technologies described herein, the service control 122 or the operations management controller 106 can be used to create (allocate, instantiate, or design) three or more types of services including, but not limited to, basic services, segmented services, and/or composite services. According to various embodiments of the concepts and technologies described herein, the service control 122 and/or the operations management controller 106 can be used to create a service by identifying one or more service modules or service components. According to various embodiments, a basic service can be created by tightly coupling one or more service components together by introducing a service control function. The service components can be formed by coupling or chaining together multiple VSFs 124. The VSFs 124 can be created as a collection of VSF components (VSFCs). It should be understood that this example is illustrative and therefore should not be construed as being limiting in any way.

In some embodiments, the operations management controller 106 or the service control 122 can be used to create (design, allocate, or instantiate) segmented services or composite services. According to various embodiments of the concepts and technologies described herein, a segmented service can be formed by chaining or joining together (or associating together) two or more service modules such as service components, basic services, segmented services, and/or composite services. Thus, the service control functions of the service modules can remain within the service modules and may or may not be complemented by other service control functions. It should be understood that this example is illustrative and therefore should not be construed as being limiting in any way.

According to various embodiments of the concepts and technologies described herein, a composite service can be formed by chaining or joining together (or associating together) two or more service modules such as service components, basic services, segmented services, and/or composite services and introducing a new or additional ("second layer") service control function that tightly couples together the service modules. Thus, the service control functions of the service modules can remain within the service modules, and may or may not be complemented by other service control functions. It should be understood that this example is illustrative and therefore should not be construed as being limiting in any way. Additional aspects of creating basic services, segmented services, and composite services will be illustrated and described in more detail below with reference to FIGS. 2-6.

FIG. 1 illustrates one control system 102, one network 104, one operations management controller 106, one service creation database 108, one inventory 110, one infrastructure control 112, one instance of infrastructure 114, one network control 118, one service control 122, one service 130, one ECOMP 132, one BSS 134, and one OSS 136. It should be understood, however, that various implementations of the operating environment 100 can include zero, one, or more than one control system 102; zero, one, or more than one network 104; zero, one, or more than one operations management controller 106; zero, one, or more than one service creation database 108; zero, one, or more than one inventory 110; zero, one, or more than one infrastructure control 112; zero, one, or more than one instance of infrastructure 114; zero, one, or more than one network control 118; zero, one, or more than one service control 122; zero, one, or more than one service 130; zero, one, or more than one ECOMP 132; zero, one, or more than one BSS 134, and zero, one, or more than one OSS 136. As such, the illustrated embodiment should be understood as being illustrative, and should not be construed as being limiting in any way.

Figure 2:
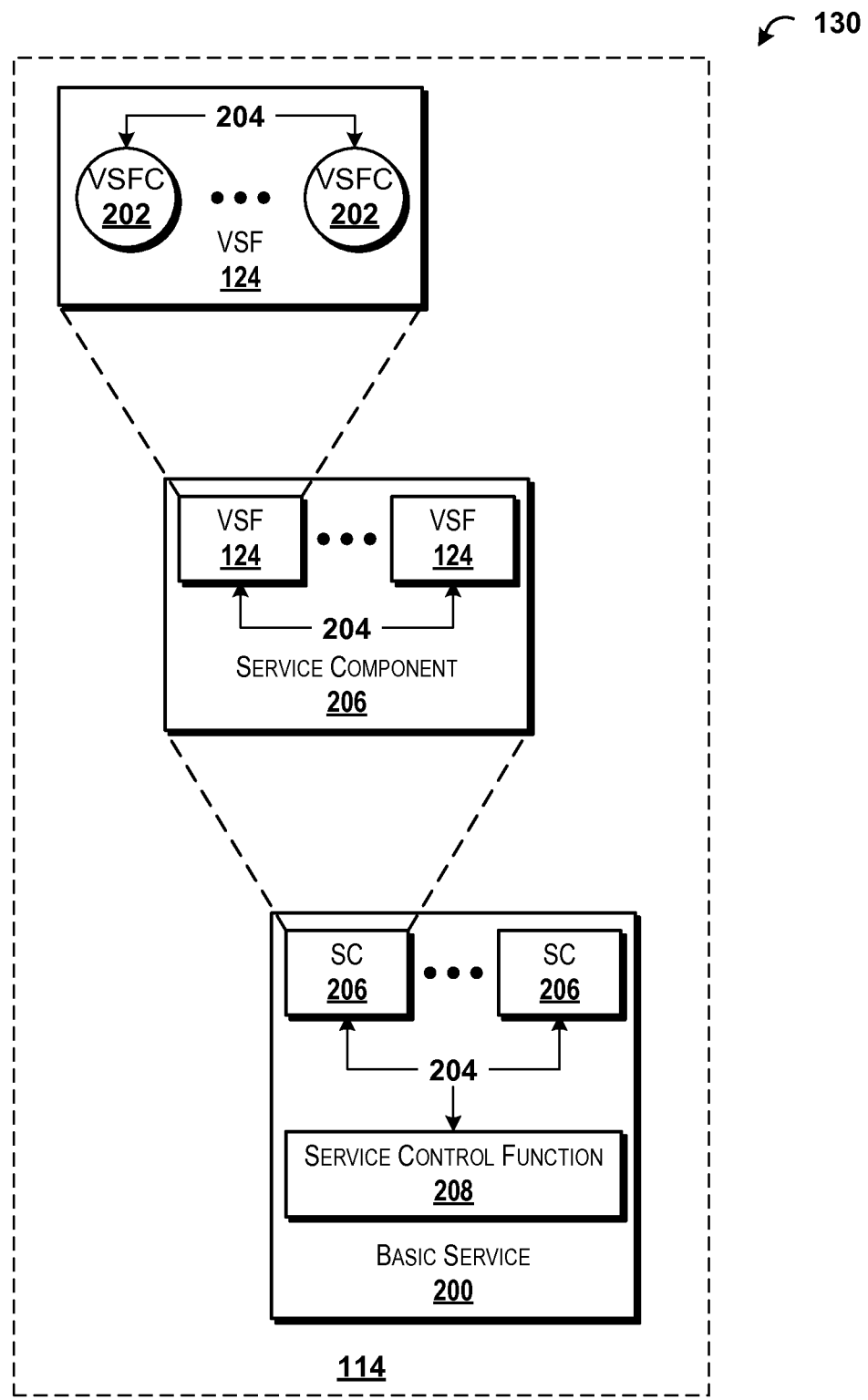
FIG. 2 is a line diagram schematically illustrating creation of a basic service using service modules, according to one illustrative embodiment of the concepts and technologies described herein.

Turning now to FIG. 2, additional aspects of the concepts and technologies described herein for creating services 130 using service modules will be described in detail. In particular, FIG. 2 illustrates creation of a basic service 200, according to one embodiment of the concepts and technologies described herein. It should be understood that this example is illustrative and therefore should not be construed as being limiting in any way.

As shown in FIG. 2, a basic service 200 can implicitly include and/or can be hosted by the infrastructure 114 illustrated and described herein. As will be illustrated and described in more detail below with reference to FIG. 4, the service control 122 can be configured to identify one or more service modules for a basic service 200 and create the basic service 200 by joining together the service modules. As noted above, the service modules can include various components. An example hierarchy of service modules for a basic service 200 is illustrated and described in FIG. 2. It should be understood that this example is illustrative and therefore should not be construed as being limiting in any way.

According to various embodiments of the concepts and technologies described herein, a VSF 124, which can include an ETSI VNF operating in the service scope, can be created by a set of one or more virtual service function components ("VSFCs") 202. The VSFCs 202 may be commonly controlled, in some embodiments. For example, the VSFCs 202 may be commonly controlled because of a vendor who provided the VSFCs 202, a location and/or domain in which the VSFCs 202 operate, or the like. In some embodiments, for example, the VSFCs 202 may come from or may be provided by a same vendor, or the like, and therefore may be commonly controlled. A VSFC can include an internal component of a VSF 124 and can perform a sub-set of the overall functionality associated with the VSF 124. The connectivity between the VSFCs 202 within a VSF 124 can be described by a VSFC graph, though this is not necessarily the case.

The VSFCs 202 can include particular functions associated with the basic service 200 such as, for example, specific application functionality, or the like. Thus, the service control 122 (or the control system 102 via execution of functionality associated with the service control 122) can create one or more VSFs 124. As is shown in FIG. 2, the VSFCs 202 can communicate with one another using network transport 204, which can be established, in some embodiments, by the network control 118 as executed by the control system 102. Thus, it can be appreciated that a VSF 124 can include and/or can implicitly rely upon infrastructure 114 and/or the network transport 204. It should be understood that this example is illustrative and therefore should not be construed as being limiting in any way.

The service control 122 can be used to tightly couple together multiple VSFs 124 to create a service component 206. Thus, a service component 206 can encapsulate a set of one or more VSFs 124 in a tightly coupled unit. In some embodiments, the VSFs 124 can be tightly coupled to form the service component 206, and as such the VSFs 124 used in the service component 206 may not be reusable outside of the service component 206. The connectivity between the VSFs 124 within a service component 206 can be described by a service component graph, if desired.

Thus, the service control 122 can identify service modules such as VSFs 124 that are desired or needed to provide various functionality of the basic service 200, and can be used to tightly couple together the identified VSFs 124 to create a service component 206. As noted above with reference to the VSFCs 202, it should be understood that the VSFs 124 can rely upon and/or implicate network transport 204 (to enable the VSFs 124 to communicate with one another and/or to pass data to one another) and/or the infrastructure 114. It should be understood that this example is illustrative and therefore should not be construed as being limiting in any way.

The service control 122 can be used to create a basic service 200 by coupling together multiple service components 206, and tightly coupling the service components 206 together by introducing a service control function 208 to control the multiple service components 206. Thus, a basic service 200 can include a set of one or more service components 206 and a service control function 208. Because the service components 206 may be tightly coupled together by the service control function 208, the service components 206 may not be reusable outside of the basic service. Connectivity between the between the service components 206 within the basic service 200 can be described by a basic service graph and the relationship between the service components 206 and the service control function 208 can be described by a service control graph.

Thus, the service control 122 can identify two or more service components 206 that are desired or needed to provide various functionality of the basic service 200, and can be used to tightly couple together the identified service components 206 to create the basic service 200. Thus, contrary to a common principle applied when creating services, namely loosely coupling components of services together, the concepts and technologies described herein can tightly couple service components 206 to one another via introduction of the service control function 208, which can render the underlying (or included) VSFCs 202, VSFs 124, and/or service components 206 non-reusable. It should be understood that this example is illustrative and therefore should not be construed as being limiting in any way.

Figure 3B:
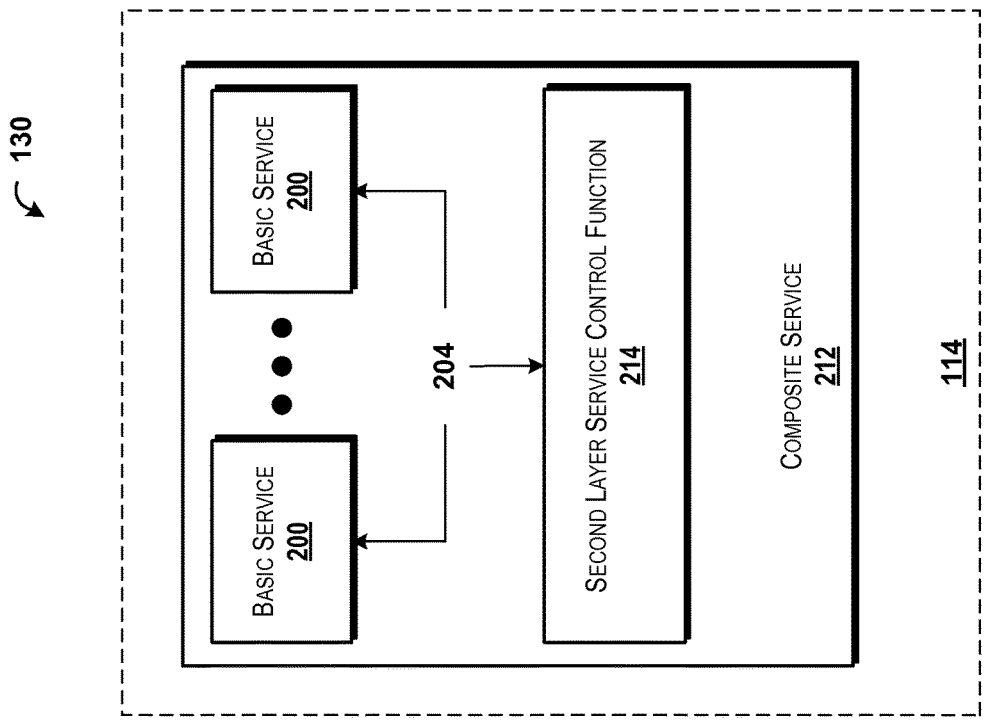
FIG. 3B is a line diagram schematically illustrating creation of a composite service using basic services and a service control function, according to one illustrative embodiment of the concepts and technologies described herein.
Figure 3A:
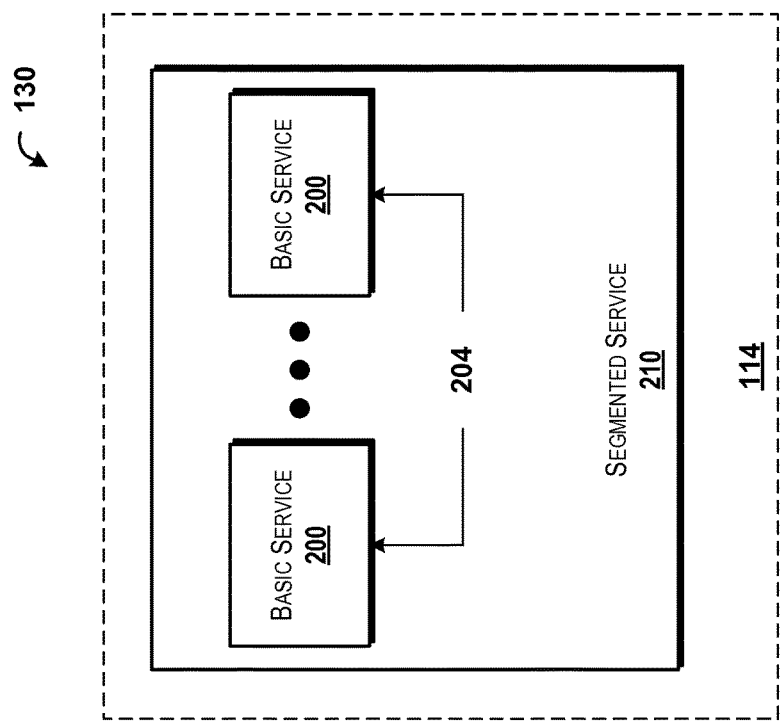
FIG. 3A is a line diagram schematically illustrating creation of a segmented service using basic services, according to one illustrative embodiment of the concepts and technologies described herein.

Turning now to FIG. 3A, additional aspects of the concepts and technologies described herein for creating services using service modules will be described in detail. In particular, FIG. 3A illustrates creation of a segmented service 210 according to one embodiment of the concepts and technologies described herein. It should be understood that this example is illustrative and therefore should not be construed as being limiting in any way.

As explained above, a segmented service 210 can be created by loosely coupling together two or more basic services 200. In particular, basic services 200 may be chained to other basic services 200 or even to service components 206 to form segmented services 210. Segmented services 210 can have a single service control function layer, which can be provided by multiple, independently operating service control functions 208 of the basic services 200 that are included in the segmented service 210. It can be appreciated that there can be one service control function 208 for each basic service 200. A segmented service graph (not shown in the FIGURES) can describe connectivity between the basic services 200 included in the segmented service 210.

According to various embodiments of the concepts and technologies described herein, the basic services 200 and/or the service components 206 that are included in a segmented service 210 can be loosely coupled to each other. Thus, the basic services 200 and/or service components 206 included in the segmented service 210 can be reused for other services 130.

An example segmented service 210 is described to illustrate the concepts and technologies described herein. In an example embodiment, a segmented service 210 can be created by loosely coupling four basic services 200, namely service A, service B, service C, and service D together. The service A can include two service components 206, namely service components A1 and A2, which can be tightly coupled together through the use of a service control function 208, namely service control function A. The result in this example can include a basic service 200 that includes two service components 206 that can be referred to as basic service A. As can be understood by the above, the basic service A must be controlled by a service control function in this case known as service control function A.

Service components B, C, and D can be similarly created. The basic services A, B, C, and D may be loosely coupled to each other through a shared user plane. The shared user plane can facilitate communication between the service components 206 that are included in the basic services A, B, C, and D. It should be understood that in various embodiments, the service control functions 208 of basic services 200 included in a segmented service 210 may be unaware of each other and may not communicate with one another. It should be understood that this example is illustrative and therefore should not be construed as being limiting in any way.

Turning now to FIG. 3B, additional aspects of the concepts and technologies described herein for creating services using service modules will be described in detail. In particular, FIG. 3B illustrates creation of a composite service 212 according to one embodiment of the concepts and technologies described herein. It should be understood that this example is illustrative and therefore should not be construed as being limiting in any way.

As explained above, a composite service 212 can be created by tightly coupling together two or more basic services 200 and introducing a second layer service control function 214 to control the basic services 200. Thus, composite services 212 may be created by chaining together segmented services 210 and/or basic services 200, and adding a higher layer service control function 208 (or multiple service control functions 208). As with segmented services 210, the composite services 212 also may include service components 206. A composite service graph can describe the connectivity between the segmented services 210, basic services 200, and/or service components 206 included in the composite service 212. A service control graph can describe the relationship between the service control functions 208 included in the composite service 212. According to various embodiments of the concepts and technologies described herein, the segmented services 210, basic services 200, and/or service components 206 included in a composite service 212 are tightly coupled to each other and may not be reused for other services.

An example first order composite service can include two layers of service control functions 208. A first layer of the two layers can contain the service control functions 208 for the basic services 200. A second layer of the two layers can include a second layer service control function 214, which can be used to tightly couple the basic services 200 together. Although only two layers are described in this example, it should be understood that higher orders of composite services 212 are possible by tightly coupling one or more composite services 212 to other composite services 212, segmented services 210, basic services 200, and/or service components 206. As such, this example is illustrative and should not be construed as being limiting in any way.

By using multiple layers of service control functions 208, the concepts and technologies described herein can create a hierarchy of service control functions 208, 214. The lowest layer service control function may connect to one or more VSFs, EMFs, and/or VSF management functions. Upper layer service control functions 208, 214 may connect to one or more lower layer service control functions 208 and/or may connect to VSFs, EMFs, and/or VSF Management Functions.

A service control 122 can be aware of components directly within its scope of control, which can include VSFs, EMFs, VSF management functions, and/or lower level service control functions 208. The service control 122 may not be aware of upper layer service control functions 208, 214. The operations management controller 106 may be aware of all service controls 122 in a service control hierarchy for any given service 130. Information about lower level service control functions 208 may be obtained from a service control function graph. It should be understood that this example is illustrative and therefore should not be construed as being limiting in any way.

According to various embodiments, events and exceptions that cannot be resolved by a service control 122 can be propagated to a next higher layer service controller. Thus, events and exceptions may be propagated upward until the event and/or exception is resolved either by a higher layer service controller or by the operations management controller 106. Instructions involving the resolution of the event and/or exception can be passed directly from the resolving entity (e.g., the operations management controller 106 and/or the service control 122) to the service controller which can perform the action of resolving the event and/or the exception. It should be understood that this example is illustrative and therefore should not be construed as being limiting in any way.

There is essentially no limit to how large the service control hierarchy can be for any given service 130. It should be noted, however, that the complexity of the service 130 may increase significantly as the number of layers within a service hierarchy increases. In other words, the higher order a tightly coupled composite service 212 is, the higher the degree of complexity involved in the management and control of the service 130.

The following example describes how a second order composite service 212, described in this example as composite service E, can be created by tightly coupling basic services 200, namely basic services A, B, C, and D together with two additional layers of service control functions 208.

A service component A1 can be tightly coupled to a service component A2 through the use of a service control function 208 called service control function A. The result can be a basic service 200 that includes two service components 206. The basic service 200 can be referred to as basic service A. Basic service A must be controlled by a service control function 208 in this case called service control function A.

A service component 206 called service component B can be controlled by a service control function 208 called service control function B, thereby forming a basic service 200 called basic service B. A similar arrangement can be used to create basic service C and basic service D. Basic services 200, namely basic services A, B, and C, may be tightly coupled together to form a composite service 212 called composite service ABC by introducing a service control function 208 called service control function C to provide control across the basic services 200. The composite service ABC can be managed by the service control function C which can communicate with the service control function A, the service control function B, and the service component C. The specific instances of basic services A, B, and C that have been tightly coupled to create the composite service ABC cannot be reused.

In the above example, the composite service ABC can be a first order composite service. The service could have been implemented as a second order composite service by introducing a higher layer service control function 208 that would have been placed on top of the service control functions A, B, and C. Additionally, the composite service ABC can be tightly coupled to a basic service 200 called basic service D using a higher layer service control function 208 called service control function E to form a second order composite service 212 called composite service E. It can be appreciated that the specific instances of the basic services 200, namely basic services A, B, C, and D, as well as the specific instance of the composite service ABC that are tightly coupled to create composite service E cannot be reused for other services. It should be understood that this example is illustrative and therefore should not be construed as being limiting in any way.

Figure 4:
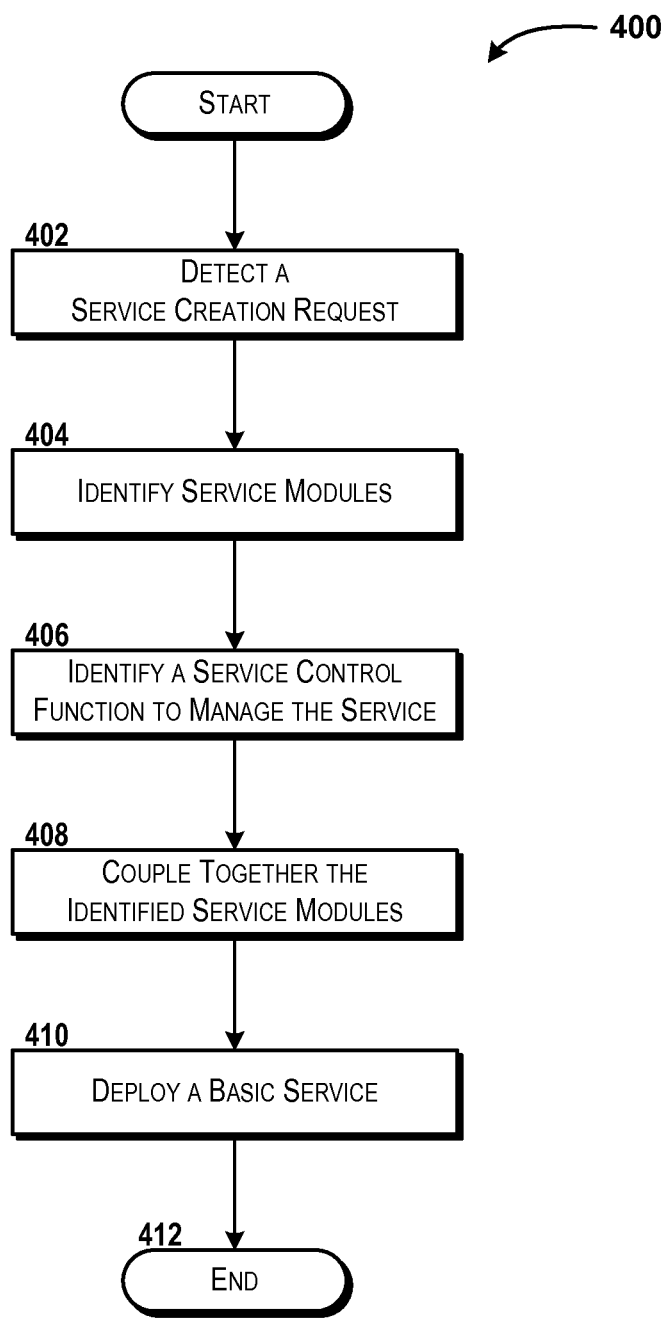
FIG. 4 is a flow diagram showing aspects of a method for creating a basic service using service modules, according to an illustrative embodiment of the concepts and technologies described herein.

Turning now to FIG. 4, aspects of a method 400 for creating a basic service using service modules will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the control system 102 to perform one or more operations and/or causing the processor to direct other components of the computing system or device to perform one or more of the operations.

For purposes of illustrating and describing the concepts of the present disclosure, the methods disclosed herein are described as being performed by the control system 102 via execution of one or more software modules such as, for example, the service control 122. It should be understood that additional and/or alternative devices and/or network nodes can provide the functionality described herein via execution of one or more modules, applications, and/or other software including, but not limited to, the service control 122. Thus, the illustrated embodiments are illustrative, and should not be viewed as being limiting in any way.

The method 400 begins at operation 402. At operation 402, the control system 102 can detect a service creation request. It should be understood that the control system 102 can detect the request in operation 402 or receive the request in operation 402. The request received or detected in operation 402 can correspond to a request for creation of the new service 130, and/or information detailing what features are to be included in the service 130 being requested. In response to detecting or receiving the request in operation 402, the control system 102 (or components thereof such as the operations management controller 106) can access one or more recipes, which can include or define policy rules to determine how a service 130 such as the new service 130 requested by way of the request detected or received in operation 402 should be created.

The policies and/or rules of the recipes also can indicate the various requirements and/or features of the service 130, as well as an architecture for the service 130, a list of resources used to provide the service 130, and/or an operational framework associated with the service 130. It should be understood that the request received or detected in operation 402 can correspond to a request for a basic service 200. Requests for segmented services 210 and/or composite services 212 will be illustrated and described in more detail below with reference to FIG. 5.

From operation 402, the method 400 proceeds to operation 404. At operation 404, the control system 102 can identify one or more service modules for the service requested. According to various embodiments of the concepts and technologies described herein, the control system 102 can identify the service modules for the service by analyzing one or more recipes or service recipes as defined herein. As explained above in detail, the service modules can include VSFCs 202, VSFs 124, and/or service components 206. Thus, the control system 102 can identify one or more functions desired or requested by way of the request detected or received in operation 402. The functions can be simple functions or complex functions and therefore may be a single function (e.g., a VSFC 202), or a set or subset of functions (e.g., a VSF 124 and/or service component 206). It should be understood that this example is illustrative and therefore should not be construed as being limiting in any way.

From operation 404, the method 400 proceeds to operation 406. At operation 406, the control system 102 can identify a service control function 208 to manage the coupled service modules identified in operation 404. In some embodiments, the control system 102 can allocate an existing service control function 208 instead of, or in addition to, creating a new service control function 208. The service control function 208 can be configured to orchestrate operations of the service modules (e.g., the VSFCs 202, the VSFs 124, and/or the service components 206). Thus, it can be appreciated that the functionality of operation 406 can include identifying an existing service control function 208 and/or creating a new service control function 208 if an existing service control function 208 is not identified.

From operation 406, the method 400 proceeds to operation 408. At operation 408, the control system 102 can couple together the service modules identified in operation 404. According to various embodiments, the control system 102 can tightly couple the service modules together using the service control function 208 created in operation 406. It can be appreciated from the above description that once the service modules are tightly coupled together by the service control function 208, the service modules may no longer be reusable. It should be understood that this example is illustrative and therefore should not be construed as being limiting in any way.

From operation 408, the method 400 proceeds to operation 410. At operation 410, the control system 102 can deploy a basic service 200. Thus, the basic service 200 can be deployed for use as the service 130 requested in operation 402, or for use in creating other more complex services 130 such as segmented services 210 and/or composite services 212. It can be appreciated that the service 130 deployed in operation 410 can include functionality associated with one or more of the service scope (e.g., VSFs 124 or the like), network scope (e.g., VNFs 120, network transport, etc.), and or can implicate the underlying infrastructure 114. Thus, the basic service 200 created by way of the method 400 can be deployed for use as the service 130 and/or for use in creating other services 130 such as segmented services 210 and/or composite services 212. An example method for creation of segmented services 210 and composite services 212 is illustrated and described below with reference to FIG. 5.

From operation 410, the method 400 proceeds to operation 412. The method 400 ends at operation 412.

Figure 5:
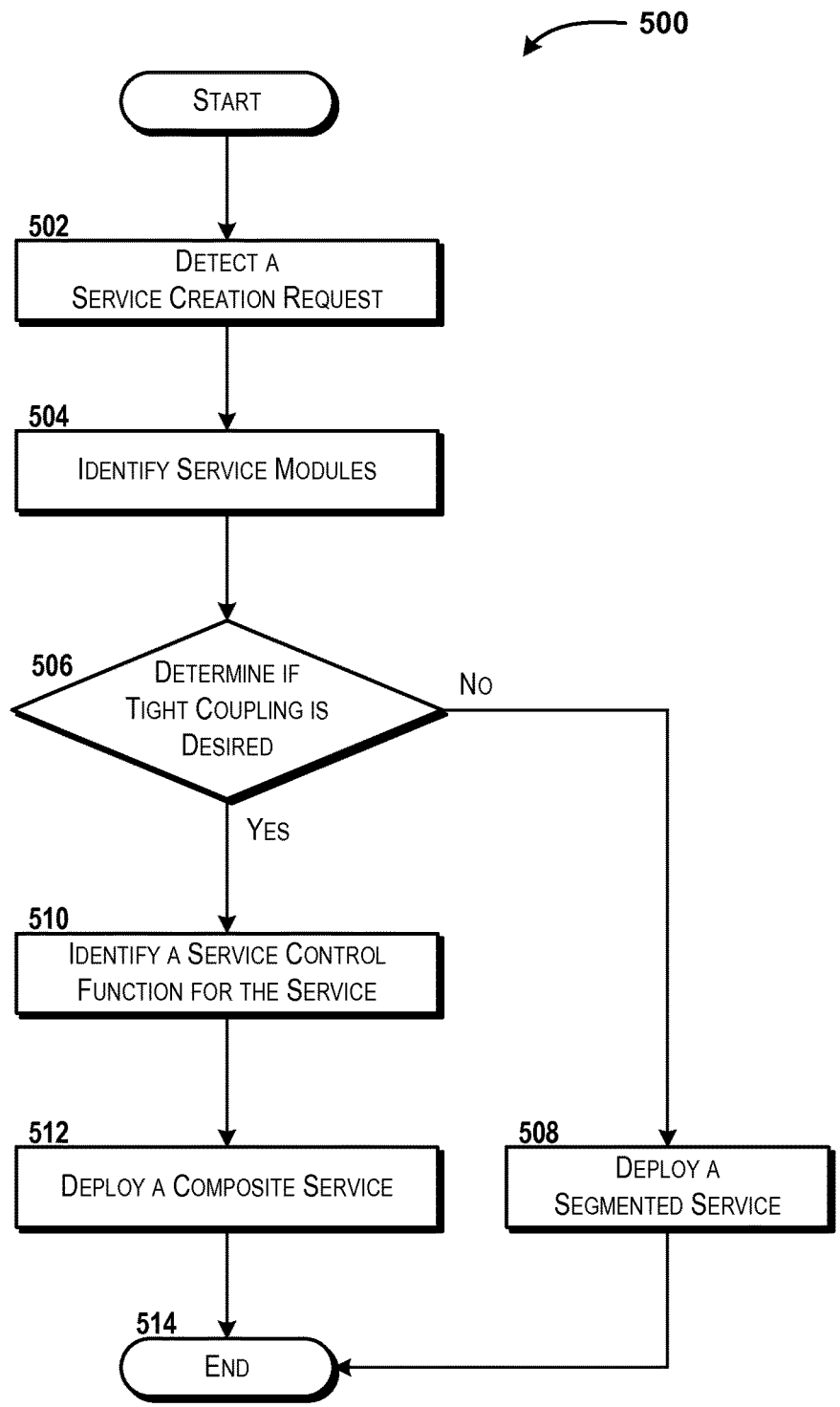
FIG. 5 is a flow diagram showing aspects of a method for creating a segmented service or a composite service using service modules, according to an illustrative embodiment of the concepts and technologies described herein.

Turning now to FIG. 5, aspects of a method 500 for creating a segmented service 210 or a composite service 212 using service modules will be described in detail, according to an illustrative embodiment. The method 500 begins at operation 502. At operation 502, the control system 102 can detect or receive a service creation request. According to various embodiments of the concepts and technologies described herein, the request detected or received in operation 502 can correspond to a request for a segmented service 210 or a request for a composite service 212. It can be appreciated that the functionality of the control system 102 with regard to operation 502 may be, but is not necessarily, substantially similar or even identical to the functionality of the control system 102 illustrated and described above with reference to operation 402 of the method 400.

From operation 502, the method 500 proceeds to operation 504. At operation 504, the control system 102 can identify one or more service modules to be included in the service 130. The service modules can include one or more VSFCs 202, VSFs 124, service components 206, and/or basic services 200. In some embodiments, the service modules also can include other segmented services 210 and/or composite services 212. Thus, the control system 102 can identify one or more functions desired or requested by way of the request detected or received in operation 502 and the modules that can provide the desired functions. The functions can be simple functions or complex functions and therefore may be a single function (e.g., a VSFC 202), or a set or subset of functions (e.g., one or more VSFs 124, service components 206, and/or basic services 200). It should be understood that this example is illustrative and therefore should not be construed as being limiting in any way.

From operation 504, the method 500 proceeds to operation 506. At operation 506, the control system 102 can determine if tight coupling of the service modules is desired for the service 130 requested. As explained above in detail, the control system 102 and/or one or more components thereof can analyze one or more recipes to determine if tight coupling is desired for the service 130. As explained above, the recipes may indicate (explicitly or implicitly) whether or not tight coupling is desired. Tight coupling may be desirable in some embodiments because tight coupling of the service modules can allow control over the service modules and/or the transport 204 between the service modules, as well as knowledge of functionality associated with and/or occurring within the service modules. One downside to tightly coupling the service modules, however, is that the service modules (e.g., the VSFCs 202, the VSFs 124, and/or the basic services 200) may no longer be reusable if tightly coupled. Thus, tightly coupling the service modules can preclude the use of the service modules for other purposes.

If the service modules are not tightly coupled, on the other hand, the service modules may be reusable for other purposes. This may be desirable if the functionality is useful for other applications or services. Thus, in operation 506, the control system 102 can determine if tight coupling of the service modules is desired and/or if the need or desire for tightly coupling the service modules overrides any downsides such as loss of reusability or the like. It should be understood that this example is illustrative and therefore should not be construed as being limiting in any way.

If the control system 102 determines, in operation 506, that tight coupling of the service modules identified in operation 504 is not desired for the service 130 requested, the method 500 can proceed to operation 508. At operation 508, the control system 102 can deploy a segmented service 210. As explained in detail above with reference to FIG. 3A, the segmented service 210 can include one or more basic services 200 and/or one or more VSFCs 202, VSFs 124, and/or service components 206. In some embodiments, the service modules also can include other segmented services 210 and/or composite services 212. The service modules can be loosely coupled together (e.g., chained together). The segmented service 210 can be deployed by the control system 102 as the service 130.

If the control system 102 determines, in operation 506, that tight coupling of the service modules identified in operation 504 is desired for the service 130 requested, the method 500 can proceed to operation 510. At operation 510, the control system 102 can identify a second layer service control function 214 to control the service modules identified in operation 502. Thus, the control system 102 can identify an existing second layer control function 214 and/or create a second layer service control function 214 to tightly couple together the one or more basic services 200, VSFCs 202, VSFs 124, and/or service components 206.

From operation 510, the method 500 proceeds to operation 512. At operation 512, the control system 102 can deploy a composite service 212 as the service 130. It can be appreciated from the description of FIG. 3B that the service 130 deployed in operation 512 can include a hierarchy of service modules, and that the service modules may be tightly coupled together and therefore may not be reusable unless the service 130 is terminated at a later time. It should be understood that this example is illustrative and therefore should not be construed as being limiting in any way.

From operation 512, the method 500 proceeds to operation 514. The method 500 also can proceed to operation 514 from operation 508. The method 500 ends at operation 514.

As mentioned above, it should be understood that a service 130 as illustrated and described herein (including basic services 200, segmented services 210, and/or composite services 212) can include elements that cross all three scopes (infrastructure, service, and network) and therefore can include service functions (e.g., VSFs 124), networking functions (e.g., VNFs 120, network scope, etc.), and/or infrastructure elements. Thus, the above examples should not be understood as being limiting.

It should be understood that, as noted above, the term "create," when used to refer to services, can be used to refer to designing a service and/or instantiating a service. Thus, when the word "create" is used herein with respect to services, the term may be used to refer to one or both of designing a service or instantiating a service. Furthermore, it can be appreciated with reference to the above description that a service such as the service 130 can be created by creating a new service control function 208 for new service modules and/or by adding service modules to an existing service 130 that can be managed and/or controlled by an existing service control function 208. Thus, the above description of the concepts and technologies described herein should be understood in these terms and not limited in any way by the example embodiments illustrated and described above.

Figure 6:
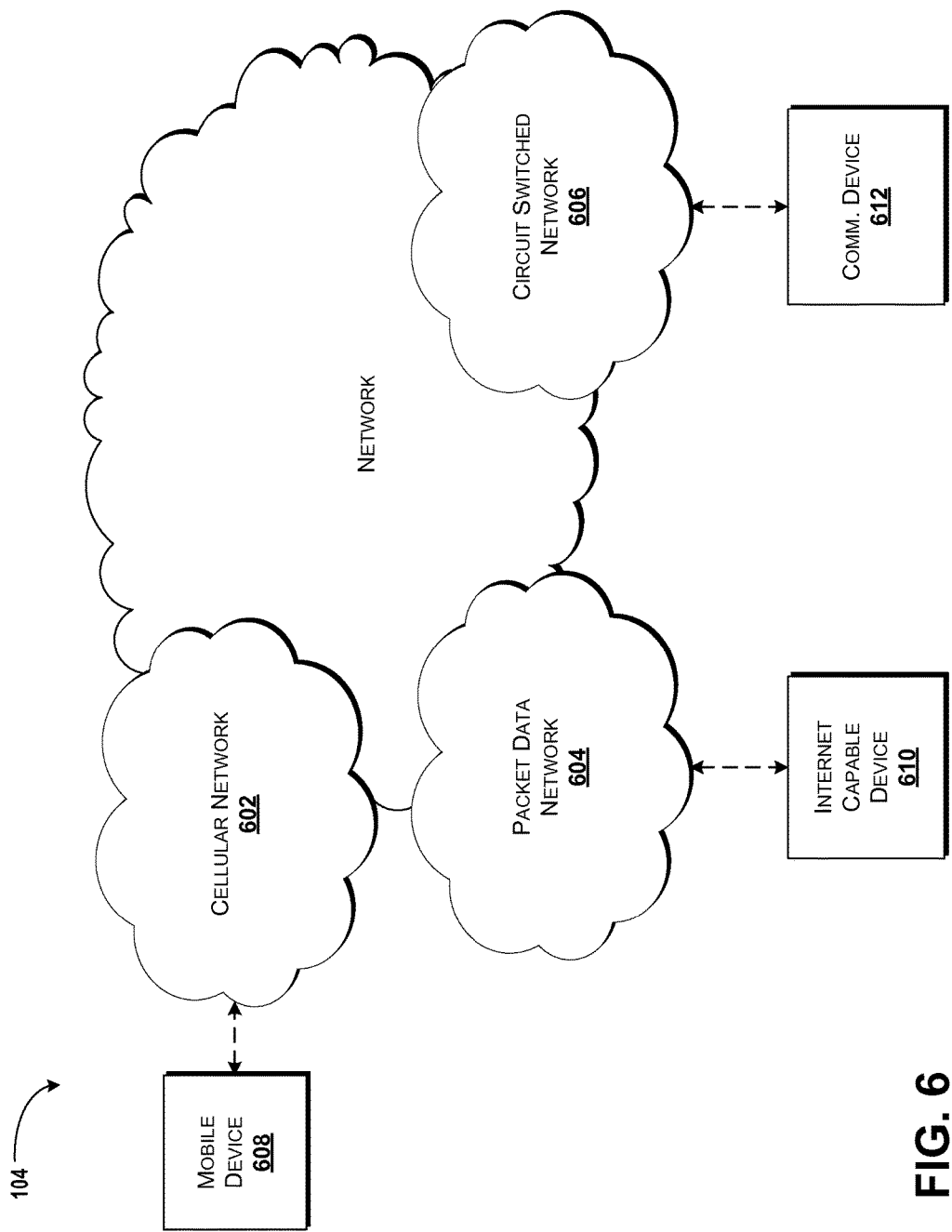
FIG. 6 schematically illustrates a network, according to an illustrative embodiment of the concepts and technologies described herein.

Turning now to FIG. 6, additional details of the network 104 are illustrated, according to an illustrative embodiment. The network 104 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards as well as evolved and future mobile standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 104 is used to refer broadly to any combination of the networks 602, 604, 606. It should be appreciated that substantially all of the functionality described with reference to the network 104 can be performed by the cellular network 602, the packet data network 604, and/or the circuit switched network 606, alone or in combination with other networks, network elements, and the like.

Figure 7:
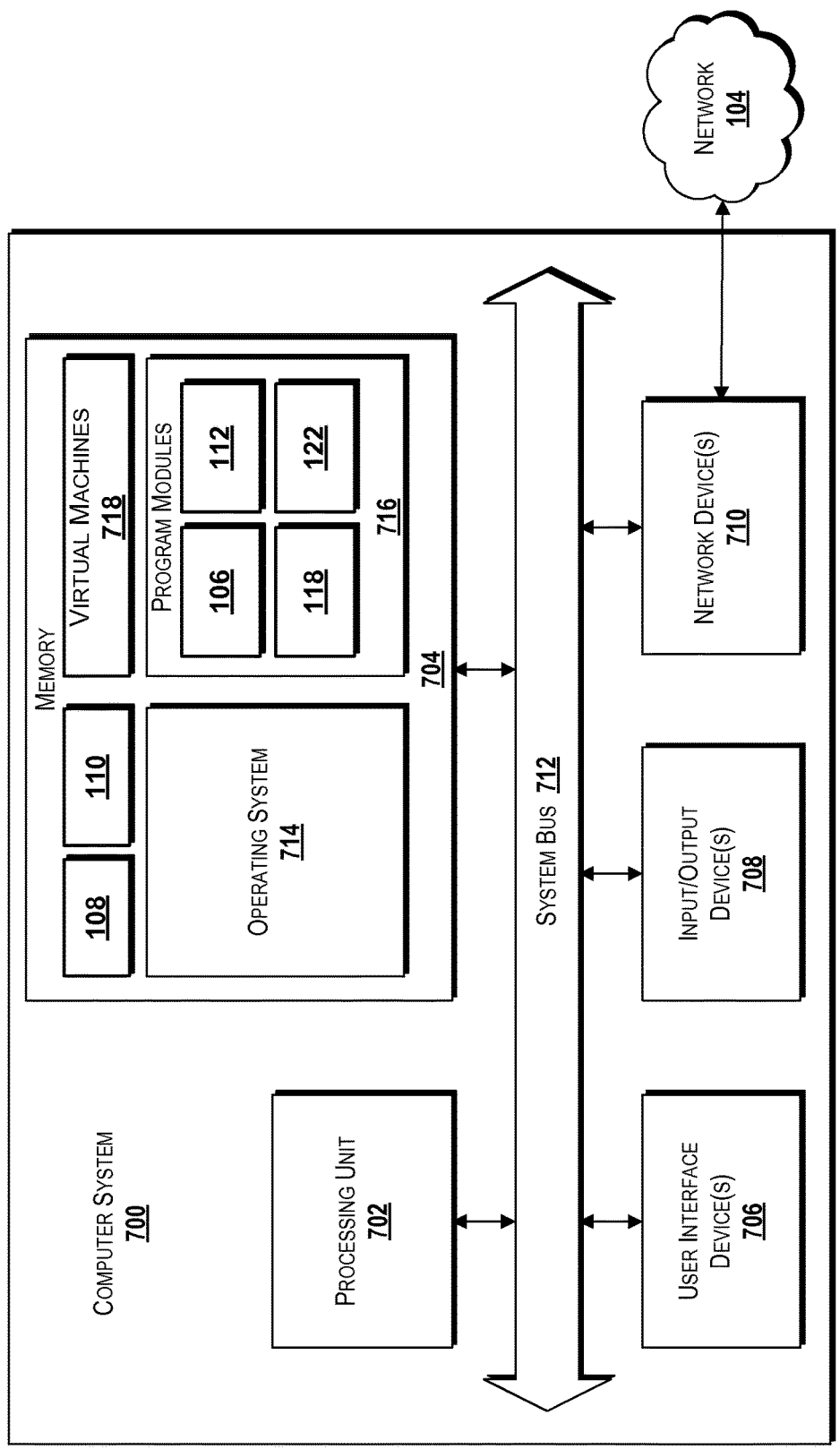
FIG. 7 is a block diagram illustrating an example computer system configured to create services using service modules, according to some illustrative embodiments of the concepts and technologies described herein.

FIG. 7 is a block diagram illustrating a computer system 700 configured to provide the functionality described herein for creating services using service modules, in accordance with various embodiments of the concepts and technologies disclosed herein. The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 716 may include various software and/or program modules described herein. In some embodiments, for example, the program modules 716 can include the operations management controller 106, the infrastructure control 112, the network control 118, and/or the like. This and/or other programs can be embodied in computer-readable media containing instructions that, when executed by the processing unit 702, perform one or more of the methods 400, 500 described in detail above with respect to FIGS. 4-5. According to embodiments, the program modules 716 may be embodied in hardware, software, firmware, or any combination thereof. Although not shown in FIG. 7, it should be understood that the memory 704 also can be configured to store the service creation database 108, the inventory 110, and/or other data, if desired. The memory 704 also can be configured to host one or more virtual machines 718. It can be appreciated that the virtual machines 718 can host one or more of the service functions, network functions, and/or can implicate one or more components of the infrastructure 114 as illustrated and described herein. It should be understood that this example is illustrative and therefore should not be construed as being limiting in any way.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network, such as the network 104. Examples of the network devices 710 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for creating services using service modules have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
   detecting, at a processor of a control system, a service creation request;
   identifying, by the processor, service modules to be included in a service requested by the service creation request;
   identifying, by the processor, a service control function that is to manage the service requested by the service creation request;
   interacting, by the processor, with an interface control to instantiate a hardware resource on network infrastructure;
   determining, by the processor, if tight coupling of the service modules is desired;
   if a determination is made that the tight coupling of the service modules is desired, deploying, by the processor and to the hardware resource, a composite service comprising the service modules and a second layer service control function that controls a basic service that corresponds to one of the service modules, the basic service having a service component that is controlled by the service control function; and
   if a determination is made that the tight coupling of the service modules is not desired, deploying, by the processor, the service modules and the service control function to the hardware resource.

2. The method of claim 1, wherein the service requested by the service creation request comprises the basic service, wherein the service modules comprise service components, and wherein each of the service components comprises two virtual service functions and network transport between the two virtual service functions.

3. The method of claim 2, wherein connectivity between the two virtual service functions is described by a basic service graph, and wherein connectivity between the service components and the service control function is described by a service control graph.

4. The method of claim 2, wherein each of the two virtual service functions comprises virtual service function components that are commonly controlled, and wherein each of the virtual service function components comprises a feature of the service.

5. The method of claim 1, wherein the service comprises a segmented service.

6. The method of claim 5, wherein the service modules comprise basic services, and wherein each of the basic services comprises an associated service component and an associated service control function that controls the associated service component.

7. The method of claim 1, further comprising establishing, by the processor, network transport for the service, wherein the network transport is established between the service modules, and wherein the network transport is established on the network infrastructure.

8. The method of claim 1, wherein deploying the service modules comprises initiating installation of the service modules.

9. A system comprising:
a processor; and
a memory that stores computer-executable instructions that, when executed by the processor, cause the processor to perform operations comprising
detecting a service creation request,
identifying service modules to be included in a service requested by the service creation request,
identifying a service control function that is to manage the service requested by the service creation request,
interacting with an interface control to instantiate a hardware resource on network infrastructure,
determining if tight coupling of the service modules is desired,
if a determination is made that the tight coupling of the service modules is desired, deploying, to the hardware resource, a composite service comprising the service modules and a second layer service control function that controls a basic service that corresponds to one of the service modules, the basic service having a service component that is controlled by the service control function, and
if a determination is made that the tight coupling of the service modules is not desired, deploying, to the hardware resource, the service modules and the service control function.

10. The system of claim 9, wherein the service requested by the service creation request comprises the basic service, wherein the service modules comprise service components, and wherein each of the service components comprises two virtual service functions and network transport between the two virtual service functions.

11. The system of claim 10, wherein connectivity between the two virtual service functions is described by a basic service graph, and wherein connectivity between the service components and the service control function is described by a service control graph.

12. The system of claim 9, wherein the service comprises a segmented service.

13. The system of claim 10, wherein each of the two virtual service functions comprises virtual service function components that are commonly controlled, and wherein each of the virtual service function components comprises a feature of the service.

14. The system of claim 10, wherein deploying the service modules comprises initiating installation of the service modules.

15. A computer storage medium having computer-executable instructions stored thereon that, when executed by a processor, cause the processor to perform operations comprising:
detecting a service creation request;
identifying service modules to be included in a service requested by the service creation request;
identifying a service control function that is to manage the service requested by the service creation request;
interacting with an interface control to instantiate a hardware resource on network infrastructure;
determining if tight coupling of the service modules is desired;
if a determination is made that the tight coupling of the service modules is desired, deploying, to the hardware resource, a composite service comprising the service modules and a second layer service control function that controls a basic service that corresponds to one of the service modules, the basic service having a service component that is controlled by the service control function; and
if a determination is made that the tight coupling of the service modules is not desired, deploying, to the hardware resource, the service modules and the service control function.

16. The computer storage medium of claim 15, wherein the service requested by the service creation request comprises the basic service, wherein the service modules comprise service components, and wherein each of the service components comprises two virtual service functions and network transport between the two virtual service functions.

17. The computer storage medium of claim 16, wherein connectivity between the two virtual service functions is described by a basic service graph, and wherein connectivity between the service components and the service control function is described by a service control graph.

18. The computer storage medium of claim 15, wherein the service comprises a segmented service.

19. The computer storage medium of claim 15, wherein the hardware resource comprises a non-virtualized network function.

20. The computer storage medium of claim 16, wherein each of the two virtual service functions comprises virtual service function components that are commonly controlled, and wherein each of the virtual service function components comprises a feature of the service.

* * * * *